May 2, 1967  H. O. SCHRÖTER  3,316,776
HAND OPERATED BRAKE
Filed July 8, 1965
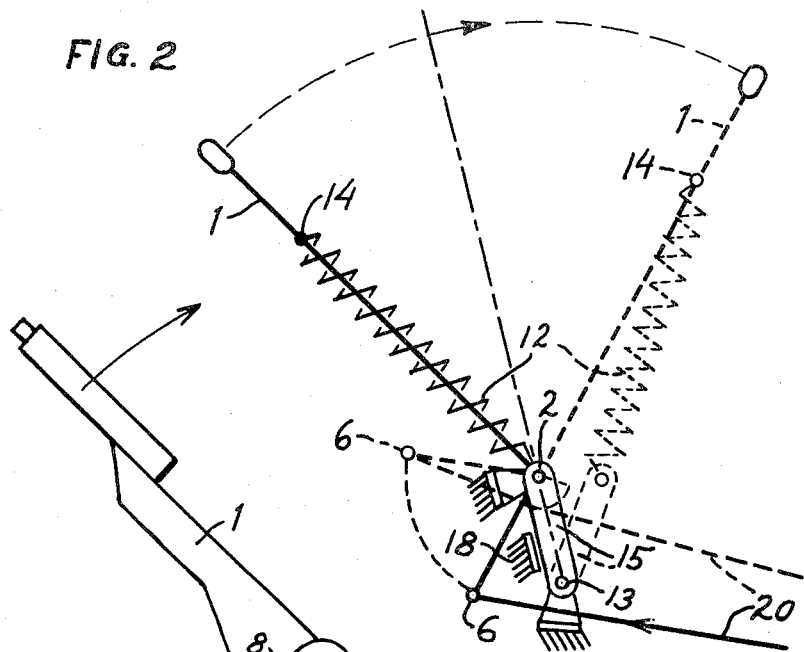
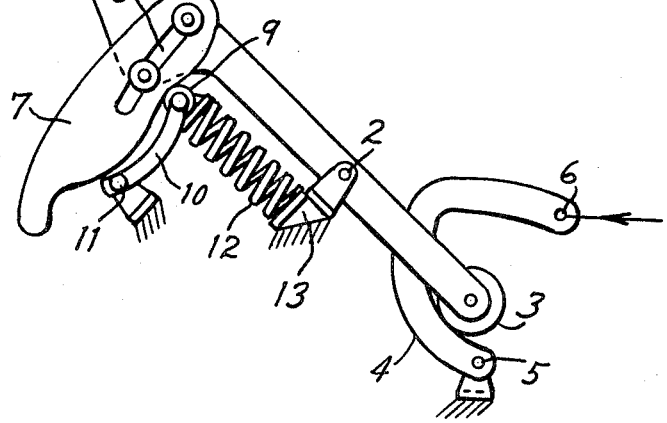
INVENTOR
Hans O. Schröter
BY Krafft & Wells
ATTORNEYS

United States Patent Office 3,316,776
Patented May 2, 1967

3,316,776
HAND OPERATED BRAKE
Hans Otto Schröter, Robert Kochstrasse 18,
Munich, Germany
Filed July 8, 1965, Ser. No. 470,371
Claims priority, application Germany, Mar. 1, 1965,
Sch 36,616
3 Claims. (Cl. 74—516)

The present invention relates to a hand brake with a variable ratio translating lever pivotable about a fixed axis in such a manner that the effective lever arm ratio increases during application of the brake. Such translating levers are used to obtain more effective braking action which is accomplished by providing at the beginning of the swinging movement a shorter ingoing path, a relatively longer outgoing path, while near the end of the swinging path a longer ingoing path and a shorter outgoing path is provided so that the work done upon the system, namely the product of the applied force and the length of the application path, can be put to more effective use.

The hand brake mechanism of this invention comprises a translating lever pivoted on a fixed axis and is characterized by a combination of the following features, some of which are old—

(a) the ratio of the effective lever arm at the input side to the effective lever arm at the output side of the translating lever is variable only in accordance with the extent of swinging movement of the lever, and in such a manner that the lever ratio increases in the braking direction;

(b) the translating lever has connected to it a pretensioned spring which supplements the actuating force, the spring being ineffective in the released position of the lever contributing to the braking force of the lever in accordance with the extent of swinging movement of the latter; and (c) the pretensioned spring is capable of being kept ineffective up to a predetermined angle of swinging movement of the lever.

Another feature of this invention is that the angle of swinging movement of the translation lever within which its actuating force is not influenced by the tension of the spring, is adjustable.

In an especially advantageous modification of the hand brake device of this invention, the ratio of the effective lever arm at the input side to that at the output side of the translating lever, increases only according to the extent of swinging movement until a maximum has been reached, and thereafter diminishes at a lesser rate, so that the force of the pretensioned spring does not become fully effective until after the maximum has been reached. Therefore during the loosening of the hand brake it will not be necessary to apply any appreciable force to the lever handle in the loosening direction if through improper adjustment there is too much lost motion in the brake linkages. The residual tension in the linkages will then still be sufficient to return the pretensioned compressional spring 12 to its maximum tension.

The hand brake mechanism of this invention has first the advantage of making it possible, with a relatively small spring, to exert the required tensioning force on the brake linkages because the force of the spring is not brought into action until after the effective lever arm ratio has commenced to increase and further increases. With only a moderate spring tension, which is multiplied with an increase of lever ratio, the same effect is produced as would result from the use of a much stronger spring.

Another important advantage of this lever mechanism is that the spring exerts only very little force in opposition to the swinging of the lever in brake releasing direction, which is due to the fact that the spring cannot supplement the brake applying action of the lever until after the brake linkages have received adequate pretensioning which is sufficient to overpower the force of the spring after relaxation of the actuating force which was supplemented by the spring. The result is, as stated above, that only a moderate tensioning of the spring will be sufficient. Since it is possible to adjust the angle of swinging movement of the translation lever within which the actuating force of the lever is not supplemented by the spring, it is easy to provide for the above-described functioning by a suitable mechanism. In order to disengage the hand brake mechanism it will then not be necessary to exert any force on the lever in the loosening direction in cases where the brake is not properly adjusted, namely when there is considerable looseness in the brake linkages.

Different forms of the invention are shown on the drawings, wherein—

FIGURE 1 shows a construction in which a compression spring acts through a pivotally mounted roller and across a curved member upon a translating lever; and FIGURE 2 shows schematically in simpler form a brake operating mechanism which has the same three functional characteristics (a), (b) and (c) as the mechanism of FIGURE 1.

In the construction shown in FIGURE 1, the hand brake lever 1 functions at the same time as a translating lever while being swingable about a fixed pivot 2, the lower end of the lever carrying a roller 3 which engages a curved lever 4 which swings about a fixed pivot 5 and has its end 6 connected to the brake shoe. A curved member 7 is provided with an arcuate slot 8 to permit the member 7 to be fastened by means of screws to the lever 1 for adjustment about the fixed pivot 2. The edge of the member 7 which is on the side of the pivot axis 2 is at first concentric with the latter but then continues in a direction away from said pivot axis. This curved edge is engaged by a roller 9 on an arm 10 carried by the fixed pivot 11. The roller 9 is kept against the curved edge of the member 7 by a pretensioned compression spring 12 supported by a fixed abutment 13.

The functioning of the device of FIGURE 1 is as follows. If the hand lever 1 is swung clockwise from the loose position shown in FIGURE 1 in the direction of the arrow about the pivot 2 to swing the curved lever 4 to apply the brake through linkages not shown, the roller 9 will at the same time move first along that portion of the edge of member 7 which is concentric with the fixed axis 2. The compression of the spring 12 will not change during this portion of the movement so that the spring will not exert any torque about the axis 2. During continued movement of the brake lever, however, the roller will move upon the outer portion of the curved edge and the spring 12 will then expand. An additional torque, depending on the form of the curved edge, will thereby be imparted in clockwise direction to the lever 1. By adjusting the curved member 7 along the direction of the slot 8, this additional torque can be applied sooner or later as desired. The application of this additional torque can be timed in such a manner that it will occur when the translation, namely the ratio of the effective lever arm at the ingoing side to the effective lever arm at the outgoing side, has increased sufficiently so that the effect of the spring 12 can be multiplied by the increased translation.

FIGURE 2, a tensile spring 12 is used which hand-operated translating lever 1 while the other end is connected through a link 15 to a fixed point 13. When the link 15 is swung all the way over in the releasing direction, it will come into engagement with a fixed abutment 18 (FIG. 2), whereby the tensile spring 12 is held in such a position that its force will be exerted almost entirely on the same axis 2 on which the hand lever 1 is pivoted. With the parts in this position, the spring will not exert any turning movement about the fixed axis 2 of the hand lever 1. The brake is connected through linkages 20 to the end 6 of an angular portion of the hand lever 1.

The operation of the device shown in FIGURE 2 is as follows: If the hand lever 1 is swung clockwise in the braking direction, as indicated by the arrow, the rod 20 connected to the brake will approach the fixed pivot axis 2 as indicated by the interrupted line in FIGURE 2. As the distance between the brake rod and the axis 2 diminishes, the force exerted by the hand brake lever 1 will increase. In the first phase of the swinging movement when the interrupted line in FIGURE 2 is reached, the force of the spring 12 will pass through the pivot axis 2 so that the spring will not exert hardly any turning moment upon the hand lever 1. Beyond that point, however, the link 15 will recede from the abutment 18 and the tensile spring 12 will exert an increasing torque upon the hand lever to effect increased application of the brake.

In some forms of this invention, means are provided for adjusting the position in which the spring begins to exert its torque upon the lever. Hereby it is possible on the one hand with a relatively small spring, whose effect on the brake linkages is multiplied with increased application of the braking force, to exert a greatly increased force on the brake. Since the spring cannot become effective until the linkage has been pretensioned sufficiently, an undesired acceleration of the hand brake lever by the spring will not be possible. On the other hand, it is not necessary during the relaxing of the linkage to exert a manual force on the hand lever in the brake releasing direction. The tensioning of the spring occurs automatically by the pretensioned brake linkages as soon as the actuating force in the braking direction is discontinued.

It will be understood that this invention is susceptible to modification in order to adapt it to different usages and conditons and, accordingly, it is desired to comprehend such modifications within this invention as may fall within the scope of the appended claims.

What is claimed is:

1. A braking mechanism comprising a manually operated lever pivotally mounted on a stationary axis and adapted to act upon brake-applying linkages, a peripherally curved member carried by the lever, an arm pivotally mounted on another stationary axis and carrying a roller that travels along the curved periphery of said member, and a spring urging the roller against the curved periphery, a portion of the periphery being approximately concentric with the axis of the lever while another and adjacent portion of the periphery has a reverse curvature so that the spring will remain inactive during the initial brake-applying movement of the lever but will contribute to the brake-applying force upon continued movement of the lever.

2. The braking mechanism of claim 1, in which the peripherally curved member is adjustable on the lever about the axis on which the lever swings.

3. The braking mechanism of claim 1, in combination with brake-applying linkages including a curved link mounted on a stationary pivot and engaged by a roller carried by the lever.

References Cited by the Examiner

UNITED STATES PATENTS

| | | | |
|---|---|---|---|
| 1,540,247 | 6/1925 | Bowman | 74—97 |
| 1,670,472 | 5/1928 | Millward | 74—97 |
| 2,555,811 | 6/1951 | Peterson | 74—517 |
| 2,588,027 | 3/1952 | McCarthy | 74—516 |

FRED C. MATTERN, JR., *Primary Examiner.*

W. S. RATLIFF, *Assistant Examiner.*